United States Patent [19]

Seidl

[11] Patent Number: 5,171,117
[45] Date of Patent: Dec. 15, 1992

[54] FASTENER WITH MULTILOBULAR INTERNAL RECESS AND TOOL ENTRY RAMPS

[75] Inventor: Richard J. Seidl, Rockford, Ill.
[73] Assignee: Textron Inc., Providence, R.I.
[21] Appl. No.: 777,658
[22] Filed: Oct. 16, 1991
[51] Int. Cl.$^5$ .................. F16B 23/00; F16B 35/06
[52] U.S. Cl. .................... 411/404; 411/919; 81/121.1
[58] Field of Search ............ 411/403, 404, 411, 911, 411/919; 81/121.1, 121.3, 121.6, 186

[56] References Cited

U.S. PATENT DOCUMENTS

| | | | |
|---|---|---|---|
| 2,777,353 | 1/1957 | Willis | 81/121.1 X |
| 3,253,625 | 5/1966 | Oestereicher | 411/911 X |
| 3,620,106 | 11/1971 | Dixon | 81/121.1 |

Primary Examiner—Neill A. Wilson
Attorney, Agent, or Firm—Trexler, Bushnell, Giangiorgi & Blackstone, Ltd.

[57] ABSTRACT

A recessed drive socket in a fastener or the like, is driven by a mating, drive tool received within the socket. The socket cavity has a multilobular cross-section defined by an alternating annular series of adjacent socket flutes and socket lobes extending parallel along a general central axis from an entrance opening into the cavity circumscribed by a peripheral support collar. Each socket lobe is truncated by a guide surface inclined from the opening at a radially outer edge of an adjacent socket flute into the cavity to form a tool clearance recess portion of the guide surface which defines the radial outer edge of the adjacent flute. The guide surface extends from the tool clearance recess portion to a termination of the guide surface within the cavity axially recessed from the cavity opening in order to provide cammed guidance of drive lobes on the drive tool against the inclined guide surface into the respective socket flutes and to prevent driving engagement of the drive lobes with the socket lobes until the cammed guidance results in axially extended depth of the drive lobes into the socket flutes for efficient and balanced torque transmission.

4 Claims, 2 Drawing Sheets

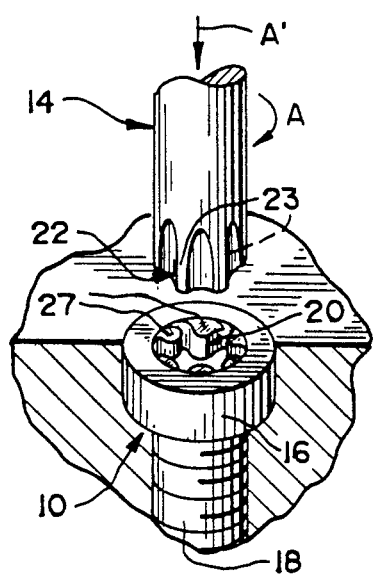
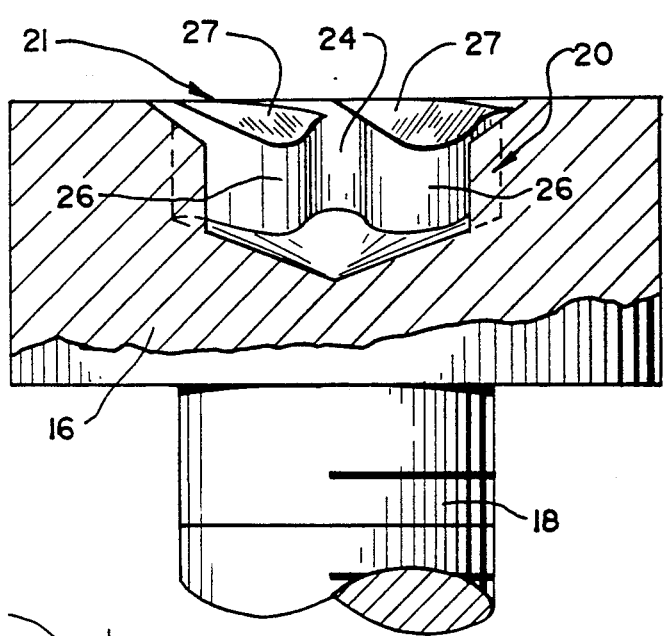
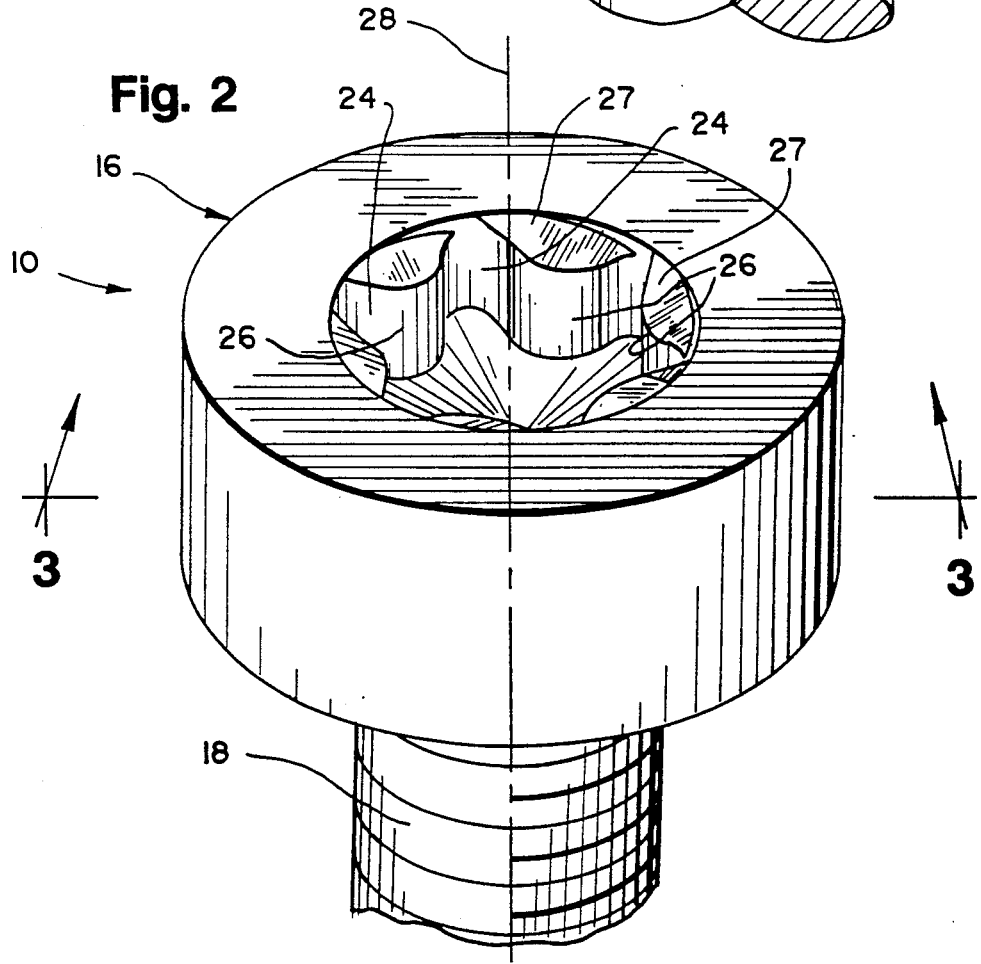

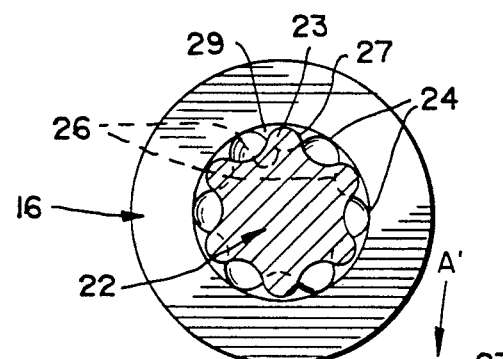
Fig. 4
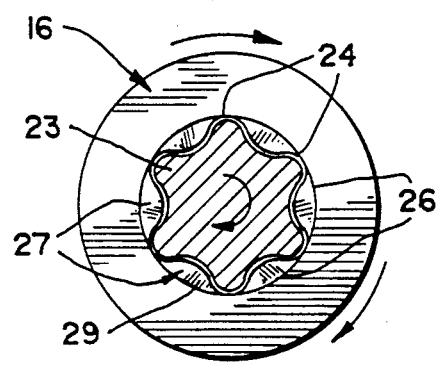
Fig. 5
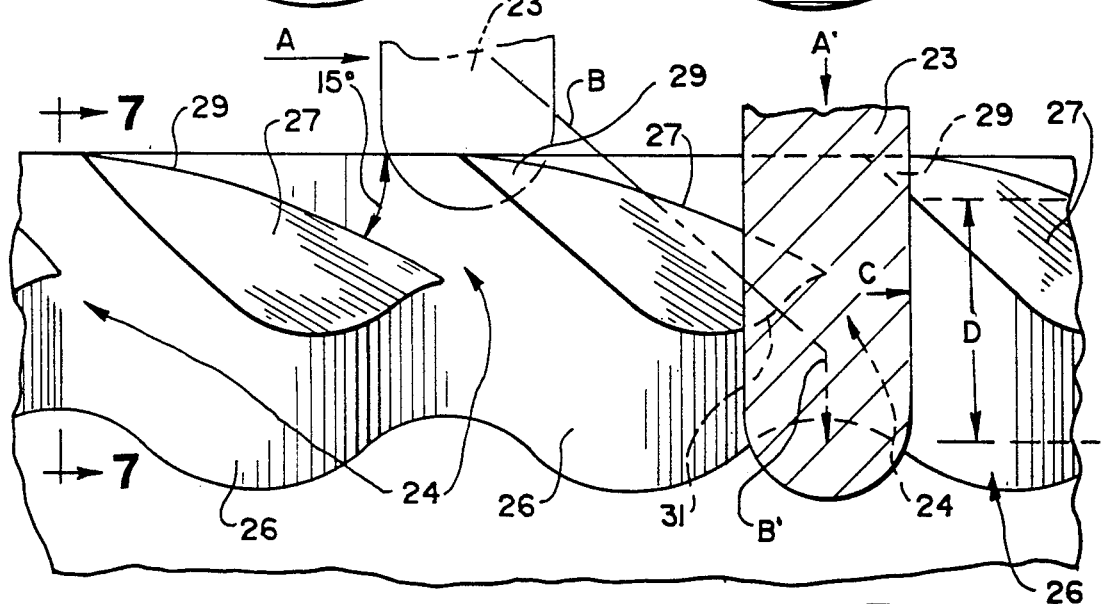
Fig. 6
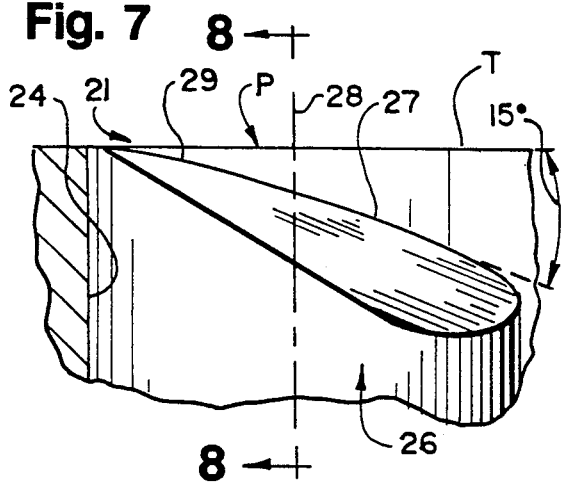
Fig. 7
Fig. 8

FASTENER WITH MULTILOBULAR INTERNAL RECESS AND TOOL ENTRY RAMPS

BACKGROUND OF THE INVENTION

The present invention relates to power driven fasteners, and more particularly to improved fasteners including drive sockets for power driven and hand operated applications.

In high volume mass production assembly lines, power drive tools are commonly maintained in continual rotation without stopping between the sequential fastener drive operations. Multilobular fastener sockets and drive tool systems have provided high efficiency in converting the applied force to driving torque as described in U.S. Pat. Nos. 3,584,667 and 4,269,246 particularly in comparison to earlier hexagonal pattern sockets as described, for example, in U.S. Pat. No. 2,777,353.

It is particularly important in the employment of continually rotating power drive tooling to achieve accurate alignment of the tool as the tool engages the fastener socket walls in order to reduce frictional and deformation damage to the socket and also to the tool. When the respective drive bearing surfaces of the tool and fastener sockets are not entirely or sufficiently engaged, the resulting "bouncing" impacts of the rotating drive tool against the misaligned fastener surfaces causes particularly severe damage. While the improvement in torque transmission is provided by multilobular socket and driver systems, it is important that all of the driver lobes enter the receiving socket flutes before any of the driver lobes drive against a respective socket lobe. Consequently, it is important to the integrity of the fastener and the secured joint as well as retarding wear of the drive tool and reducing damage to the fastener socket that the drive tool bit pass into the socket flutes and attain a proper axial depth of engagement therein before the driver bit lobes are brought into virtually simultaneous driving engagement with the respective drive impact wall surfaces of the socket lobes. Accordingly, the present invention provides an improved fastener socket which ensures sufficient depth of engagement by the drive tool bit before torque transmission.

SUMMARY OF THE INVENTION

A recessed drive socket in a fastener or the like, is driven by a mating, drive tool received within the socket. The socket cavity has a multilobular cross-section defined by an alternating, annular series of adjacent socket flutes and socket lobes extending parallel along a general central axis from an entrance opening into the cavity circumscribed by a peripheral support collar. Each socket lobe is truncated by a guide surface thereof inclined from said opening at a radially outer edge of an adjacent socket flute into the cavity to form a tool clearance recess portion of the guide surface which defines the radial outer edge of the adjacent flute. The guide surface extends from the tool clearance recess portion to a termination of the guide surface within the cavity axially recessed from the cavity opening in order to provide cammed guidance of drive lobes on the drive tool against the inclined guide surface into the respective socket flutes and to prevent driving engagement of the drive lobes with the socket lobes until the cammed guidance results in axially extended depth of the drive lobes into the socket flutes for efficient and balanced torque transmission.

In preferred embodiments, the guide surfaces on the socket lobes extend from respectively adjacent socket flutes across the socket lobes to the respective next adjacent socket flutes, so that the guide surfaces entirely truncate the socket lobes. Each of the guide surfaces may include a planar surface forming a compound angled guide ramp which together promote cammed guidance and delay of the insertion of the drive lobes into the socket flutes until axial depth of the drive lobes is achieved.

BRIEF DESCRIPTION OF THE DRAWINGS

FIG. 1 is a perspective view of a driver tool and a fastener embodiment in accordance with the present invention, as the driving tool approaches driving engagement of the fastener;

FIG. 2 is an enlarged perspective view of the fastener and socket shown in FIG. 1;

FIG. 3 is a sectional view of the fastener and socket through a plane indicated by line 3—3 in FIG. 2;

FIG. 4 is an end view of the engagement of the driver tool and the fastener socket shown in FIG. 1 illustrating initial relative misalignment of the respective tool and socket lobes in the socket prior to tool bit engagement;

FIG. 5 is an end view similar to FIG. 4, illustrating relative alignment of the respective tool and socket lobes in driven rotation of the fastener;

FIG. 6 is an enlarged fragmentary side view of socket lobes of the fastener in FIGS. 1-5 and showing a diagrammatic path of entry of one of the tool lobes into the fastener socket;

FIG. 7 is an enlarged fragmentary view of one of the fastener socket lobes similar to FIG. 6, showing the inclination of a tool guide surface formed on the socket lobe; and FIG. 8 is a fragmentary view similar to FIG. 7 and illustrating a second angle of inclination of the tool guide surface.

DETAILED DESCRIPTION OF THE ILLUSTRATED EMBODIMENT

Referring to FIG. 1, a fastener in accordance with the present invention and generally designated by a reference character 10 is shown together with an approaching drive tool shaft 14. The fastener 10 includes a head portion 16 and a threaded shank portion 18. Within the fastener head portion 16 is formed a drive socket or cavity generally designated by a reference character 20. As best seen in FIG. 3, the drive socket 20 has a multilobular configuration into which a corresponding multilobular bit end 22 of the tool 14 is inserted for rotational torque transmission which drives the fastener 10 into secured assembly (not shown). The multilobular configuration of the socket cavity 20 is defined by an alternating, annular arrangement of adjacent radially aligned open flutes 24 and convex lobes 26 which extend generally parallel to the central axis 28. This multilobular configuration as shown is known in the trade as the TORX ® drive system and is disclosed in U.S. Pat. No. 3,584,667 mentioned above. As best shown in FIG. 5, the drive lobes 23 of the tool bit 22 closely conform for insertion within the socket flutes 24 so that the drive lobes 23 rotationally bear against the socket lobes 26 in the correct relative alignment for torque transmission to the fastener 10. For example, in a power drive tool operation, the drive bit 22 is preferably continually rotated at, for example, approximately 500 rpm, as indicated by arrow A, with a representative end load of approximately 50 psi applied on the tool shaft 14 as indicated by arrow A' in FIG. 1. However, the initial random misalignment will not allow insertion of the drive lobes 23 into the socket flutes 24. Even with a hand operated tool 14, the initial engagement of the bit 22 and drive lobes 23 can be relatively misaligned with the socket flutes 24 as depicted in FIG. 4, but the normal manually imposed end load will cause the tool 14 to rotate into aligned position as more fully described hereinafter.

In order to prevent premature driving engagement by the drive lobes 23 against the socket lobes 26 until the drive lobes 23 have been received within the socket flutes 24 as shown in FIG. 5, the socket lobes 26 are each truncated along respective guide surfaces 27 which are recessed into the socket 20 from the opening mouth thereof 21. Each guide surface 27 on the socket lobe 26 is inclined at the socket opening 21 beginning at a radially outer edge of a socket flute 24 adjacent to the respective socket lobe 26. As best shown in FIG. 6, when each approaching drive lobe 23 initially engages a guide surface 27, initially misaligned with any socket flute 24, the inclemental progress of the continual rotation of the drive lobe 23 induces a cam-action sliding descent of the drive lobe 23 along the guide surface 27 in the path indicated by directional arrow B. All six of the drive lobes 23 will simultaneously follow corresponding paths B along the corresponding guide surfaces 27, although for simplicity only a single drive lobe 23 and path B have been illustrated.

In order to eliminate any possibility that one or more of the drive lobes 23 could prematurely engage a socket lobe 26 at a shallow location adjacent the socket opening 21 which would result in bouncing and consequent damage to both the driver bit 22 and socket 20, each of the inclined guide surfaces 27 begins truncation of the respective socket lobe 26 immediately at the socket opening 21. The truncation forms a tool clearance recess portion 29 of the guide surface 27 to define the radially outer edge of the adjacent socket flute 24 as indicated in FIG. 6. As a result, even if all six of the drive lobes 23 are initially aligned with corresponding socket flutes 24 at the initial entry of the bit 14 through the socket mount 21, none of the drive lobes 23 can engage or impart rotational torque against the immediately adjacent socket lobe 26 as shown in FIG. 6 because of the rotational clearance to the drive socket 23 by the clearance recess portion 29 of the guide surface 27. The tool clearance recess portion 29 prevents any torque transmission to the lobe 26, but instead initiates the cammed descent of the drive lobe 23 thereon along the path B leading to the next adjacent socket flute 24. As the rotating drive lobe 23 continues on the cammed path B and reaches the recessed terminal edge 31 of the guide surface 27, all six of the drive lobes 23 will approach radial and axial alignment with the next respective socket flute 24 so that the last increment of cammed descent guides an abrupt but brief axial drop of the six drive lobes 23 through the socket flutes 24 along the path portion indicated by B'. Only after dropping along path portion B' are the six drive lobes 23 in the successive positions of full insertion within the respective socket flutes 24 to enable torque transmission engagement as indicated by arrow C simultaneously against the six respectively adjacent socket lobes 26 which drives the fastener rotation as indicated by the solid line location of the drive socket 23 in FIG. 6. Most importantly, the axial drop of the drive lobes 23 along path B' into full insertion of all six of the drive lobes 23 within the socket flutes 24 produces substantial dimensional depth as indicated by D of the engagement by the six drive lobes 23 against the respective six socket lobes 26. The depth of engagement D ensures that the simultaneous, multilobular torque transmission is sufficiently distributed over the socket lobes 26 to attain balanced rotation of the fastener virtually independent of the mass and resistance of the joint being fastened. Furthermore, stripping or reaming of the fastener drive sockets and damage to the bit 22 and drive lobes 23 themselves is prevented by the efficiently distributed torque transmission over the depth of engagement D.

As an additional operational benefit, the multiple, inclined guide surfaces 27 promote smooth realignment of the tool bit 22 and fastener socket 20 particularly guided by the compound angle of the surfaces 27 as indicated in FIGS. 7 and 8. When the bit 22 approaches the socket mouth 21 from a concentrically misaligned orientation, an individual socket lobe 23 will be urged upon initial engagement with the tool clearance recess portion 29 into cammed descent along the guide surface 27 rather than creating a bouncing and misaligned impact against an axial surface of a socket lobe. The cammed descent of the initially engaging, but concentrically misaligned drive lobe 23 thereby leads the remaining socket lobes into gradually improved concentric alignment in succeeding rotational engagement against the remaining respective guide surfaces 27.

While the angle of inclination of the guide surfaces 27 may be variably suited to the relative dimensions of both the fastener socket 10 and drive bit 22, good results have been obtained by a fabricated inclination of approximately 15° relative to a line T in a plane P at the socket opening 21 perpendicular to the central axis 28 and tangent to the circumference of the socket opening at a radially outer edge of the adjacent socket flute 24 as shown in FIG. 7. Preferably, the inclination of the guide surfaces 27 is compounded by forming an additional, second angle of approximately 15° relative to a line in the same plane P at the socket opening 21 where the line lies along a radius R of the socket opening 21 as shown in FIG. 8.

While particular embodiments of the present invention have been described herein, it will be obvious to those skilled in the art that changes and modifications in various aspects may be made without departing from the broad scope of the invention. Consequently, the scope of the invention is not limited by any particular embodiment but is defined by the appended claims and equivalents thereof.

The invention is claimed as follows:

1. A recessed drive socket for receiving a mating, rotational drive tool therein, comprising: a socket cavity having a multilobular cross-section defined by an alternating, annular series of adjacent socket flutes and socket lobes extending parallel along a generally central axis from an opening into the cavity circumscribed by a peripheral support collar, wherein each socket lobe is truncated by a guide surface thereof inclined relative to said opening and beginning at a point on a radially outer surface of an adjacent one of said flutes, and extending into said cavity to form a tool clearance recess portion of said guide surface extending from said radially outer surface of said adjacent flute, and said guide surface extending therefrom to a termination within said cavity axially recessed from said opening in order to provide cammed guidance of drive lobes on said tool against said inclined guide surface into said socket flutes and to prevent driving engagement of said drive lobes with said socket lobes until said cammed guidance results in axially extended depth of said drive lobes into said socket flutes.

2. A recessed drive socket for receiving a mating, rotational drive tool therein, comprising: a socket cavity having a multilobular cross-section defined by an alternating, annular series of adjacent socket flutes and socket lobes extending parallel along a generally central axis from an opening into the cavity circumscribed by a peripheral support collar, wherein each socket lobe is truncated by a guide surface thereof inclined relative to said opening and beginning at a point on a radially outer surface of an adjacent one of said flutes, and extending into said cavity to form a tool clearance recess portion of said guide surface extending from said radially outer surface of said adjacent flute, and said guide surface extending therefrom to a termination within said cavity axially recessed from said opening in order to provide cammed guidance of drive lobes on said tool against said inclined guide surface into said socket flutes and to prevent driving engagement of said drive lobes with said socket lobes until said cammed guidance results in axially extended depth of said drive lobes into said socket flutes, wherein said guide surface extends from said adjacent socket flute across said socket lobe to a next adjacent said socket flute.

3. A recessed drive socket for receiving a mating, rotational drive tool therein, comprising: a socket cavity having a multilobular cross-section defined by an alternating, annular series of adjacent socket flutes and socket lobes extending parallel along a generally central axis from an opening into the cavity circumscribed by a peripheral support collar, wherein each socket lobe is truncated by a guide surface thereof inclined relative to said opening and beginning at a point on a radially outer surface of an adjacent one of said flutes, and extending into said cavity to form a tool clearance recess portion of said guide surface extending from said radially outer surface of said adjacent flute, and said guide surface extending therefrom to a termination within said cavity axially recessed from said opening in order to provide cammed guidance of drive lobes on said tool against said inclined guide surface into said socket flutes and to prevent driving engagement of said drive lobes with said socket lobes until said cammed guidance results in axially extended depth of said drive lobes into said socket flutes, wherein said guide surface also includes a planar surface forming an angle of approximately 15° relative to a line in a plane at said cavity opening perpendicular to said central axis, and tangent to a circumference of said cavity opening at a radially outer edge of said adjacent socket flute.

4. A socket according to claim 3 wherein said guide surface also forms an angle of approximately 15° relative to a line in said plane at said cavity opening perpendicular to said central axis, along a radius of said cavity opening.

* * * * *